United States Patent
Steiner (10) Patent No.: US 10,939,407 B2
(45) Date of Patent: Mar. 2, 2021

(54) METHOD AND APPARATUS FOR WI-FI LOCATION DETERMINATION

(71) Applicant: Apple Inc., Cupertino, CA (US)

(72) Inventor: Itai Steiner, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/123,797

(22) PCT Filed: Mar. 28, 2014

(86) PCT No.: PCT/US2014/032246
§ 371 (c)(1),
(2) Date: Sep. 6, 2016

(87) PCT Pub. No.: WO2015/147876
PCT Pub. Date: Oct. 1, 2015

(65) Prior Publication Data
US 2017/0019876 A1    Jan. 19, 2017

(51) Int. Cl.
*H04W 64/00* (2009.01)
*H04W 84/12* (2009.01)

(52) U.S. Cl.
CPC .......... *H04W 64/003* (2013.01); *H04W 84/12* (2013.01)

(58) Field of Classification Search
CPC ............................ H04W 64/003; H04W 84/12
See application file for complete search history.

(56) References Cited

U.S. PATENT DOCUMENTS

| | | | |
|---|---|---|---|
| 2003/0234741 A1 | 12/2003 | Rogers et al. | |
| 2005/0255890 A1 | 11/2005 | Nakada | |
| 2008/0089318 A1 | 4/2008 | Marshall | |
| 2008/0309556 A1* | 12/2008 | Hohl | G01S 5/0289 342/451 |
| 2009/0122773 A1 | 5/2009 | Gogic | |
| 2009/0129291 A1* | 5/2009 | Gupta | H04W 8/26 370/254 |
| 2011/0268044 A1* | 11/2011 | Yun | H04W 24/00 370/329 |

(Continued)

FOREIGN PATENT DOCUMENTS

| | | |
|---|---|---|
| CN | 101652673 A | 2/2010 |
| CN | 102480744 A | 5/2012 |

(Continued)

OTHER PUBLICATIONS

Notice of Allowance received for Taiwan Patent Application No. 104105112, dated Nov. 28, 2016, 3 pages of Taiwan Notice of Allowance including 1 page of English Translation.

(Continued)

*Primary Examiner* — Mehmood B. Khan
(74) *Attorney, Agent, or Firm* — Fay Kaplun & Marcin, LLP (57) ABSTRACT

The disclosure generally relates to a method, system and apparatus for autonomous Wi-Fi location determination by using information from neighboring access points (APs) along with an optional range measurements. In one embodiment, a root AP determines its location as a function of neighboring AP's location and the distance measured between the root AP and each of the corresponding neighbors. The location information can be stored internally or reported to external resource.

19 Claims, 7 Drawing Sheets

(56) References Cited

U.S. PATENT DOCUMENTS

| | | |
|---|---|---|
| 2011/0298659 A1 | 12/2011 | Alizadeh-Shabdiz |
| 2012/0196621 A1 | 8/2012 | Alizadeh-Shabdiz et al. |
| 2013/0094390 A1 | 4/2013 | Chhabra |
| 2013/0172005 A1* | 7/2013 | Finlow-Bates ..... H04W 64/003 455/456.1 |
| 2013/0267257 A1* | 10/2013 | Palanki ............... H04W 64/003 455/456.5 |
| 2013/0281084 A1* | 10/2013 | Batada .................... H04W 4/80 455/426.1 |
| 2014/0073352 A1 | 3/2014 | Aldana et al. |
| 2014/0134991 A1* | 5/2014 | Walker .................. H04W 24/02 455/418 |
| 2014/0274136 A1* | 9/2014 | Edge ....................... H04L 67/18 455/456.2 |
| 2014/0286324 A1* | 9/2014 | Aldana ................. G01S 5/0081 370/338 |
| 2015/0063228 A1* | 3/2015 | Aldana ................. H04W 64/00 370/329 |
| 2015/0094103 A1* | 4/2015 | Wang .................... H04W 4/023 455/456.6 |
| 2015/0257120 A1* | 9/2015 | Prechner ............. H04W 64/003 455/456.1 |
| 2016/0044524 A1* | 2/2016 | Ben-Haim ............ H04W 24/10 370/252 |
| 2016/0192136 A1* | 6/2016 | Pan ........................ H04W 12/06 455/456.1 |
| 2016/0309345 A1* | 10/2016 | Tehrani ............. H04W 72/0426 |
| 2018/0014354 A1* | 1/2018 | Edge ..................... H04W 4/029 |

FOREIGN PATENT DOCUMENTS

| | | |
|---|---|---|
| EP | 2482583 A1 | 8/2012 |
| WO | 2015/147876 A1 | 10/2015 |

OTHER PUBLICATIONS

Office Action received for Taiwanese Patent Application No. 104105112, dated Apr. 7, 2016, 8 pages of Taiwanese Office Action including 1 page of English translation.

Kakani et al. "CIDs 1424, 1671, 1418 Regarding Fine Timing Measurement", IEEE 802.11, Wireless LANs, dated Sep. 17, 2013, 4 pages.

International Preliminary Report on Patentability and Written Opinion Received for PCT Patent Application No. PCT/US2014/032246, dated Oct. 13, 2016, 9 pages.

International Search Report and Written Opinion received for PCT Patent Application No. PCT/US2014/032246, dated Dec. 17, 2014, 13 pages.

Office Action received for Korean Patent Application No. 2016-7023628, dated Jul. 3, 2017, 5 pages including 2 pages of English translation.

Notice of Allowance received for Korean Patent Application No. 10-2016-7023628, dated Mar. 7, 2018, 3 pages including 1 page of English translation.

Office Action received for European Patent Application No. 14887605.5 dated Aug. 31, 2018, 4 pages.

Office Action received for Chinese Patent Application No. 201480076135.4, dated Nov. 2, 2018, 8 pages.

Office Action received for European Patent Application No. 14887605.5, dated Jul. 1, 2019, 9 pages.

Office Action issued for Chinese Patent Application No. 201480076135.4 dated Jun. 11, 2019, 7 pages.

Communication received for European Patent Application No. 14887605.5, dated Feb. 1, 2018, 1 page.

Communication received for European Patent Application No. 14887605.5, dated Jan. 4, 2018, 2 page.

Extended European Search Report received for European Patent Application No. 14887605.5, dated Jan. 15, 2018, 10 pages.

* cited by examiner

METHOD AND APPARATUS FOR WI-FI LOCATION DETERMINATION

BACKGROUND

1. Field

The disclosure relates to a method and apparatus for autonomous Wi-Fi location determination. More specifically, the disclosure relates to method, system and apparatus for autonomous Wi-Fi location determination by using information from neighboring access points (APs) along with an optional range measurements.

2. Description of Related Art

High-traffic areas such as airports, transit stations, educational and hospital campuses, stadiums and other professional or entertainment venues provide internet access, typically through one or more wireless local area networks (WLAN). Such networks provide Wi-Fi access to wireless stations (STAs). With the wireless network demand on the rise, these WLANs struggle to maintain viable wireless access and provide additional services, such as helping locate the STAs within a network.

Locating an STA within a Wi-Fi system requires knowledge of the network equipment (i.e., AP) corresponding with the STA. The existing solutions require manually measuring the AP's location and entering the information into an AP location database. Alternatively, crowd-sourcing is used to populate the AP locations database. An AP may be non-stationary or it may be moved to a different location for a verity of reasons. Because the AP is usually unaware and uninvolved in its own location determination process, the conventional methods result in inaccurate and incomplete STA location determination.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Certain embodiments may be used in conjunction with various devices and systems, for example, a Personal Computer (PC), a desktop computer, a sensor device, a BT device, a BLE device, an Ultrabook™, a mobile computer, a laptop computer, a notebook computer, a tablet computer, a server computer, a handheld computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a video device, an audio device, an audio-video (AV) device, a wired or wireless network, a wireless area network, a Wireless Video Area Network (WVAN), a Local Area Network (LAN), a WLAN, a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof,, devices and/or networks operating in accordance with existing Wireless Fidelity (Wi-Fi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Wi-Fi based location techniques, such as received signal strength indicator (RSSI), Time-Of-Flight (ToF) or Fine-Time-Measurement (FTM) need to know the location of each responding AP in order to accurately locate the mobile device. AP Location determination, in a known or unknown environment, is currently not handled by the wireless protocol. In addition, several algorithms to determine or estimate the location of APs (such as SLAM-based) exist and can provide AP location estimation in a known, semi-known or unknown environment. But such algorithms lack a protocol enabling these estimation and calculation. These algorithms can provide more accurate AP location estimations when extra measurements and/or new information (e.g., new range measurements") is provided.

An embodiment of the disclosure provides a protocol scheme for enabling a network equipment (Wi-Fi APs) to determine or estimate its own location autonomously. An optional and accumulating ToF-based range measurements can be used to further increase estimation accuracy.

Figure 1:
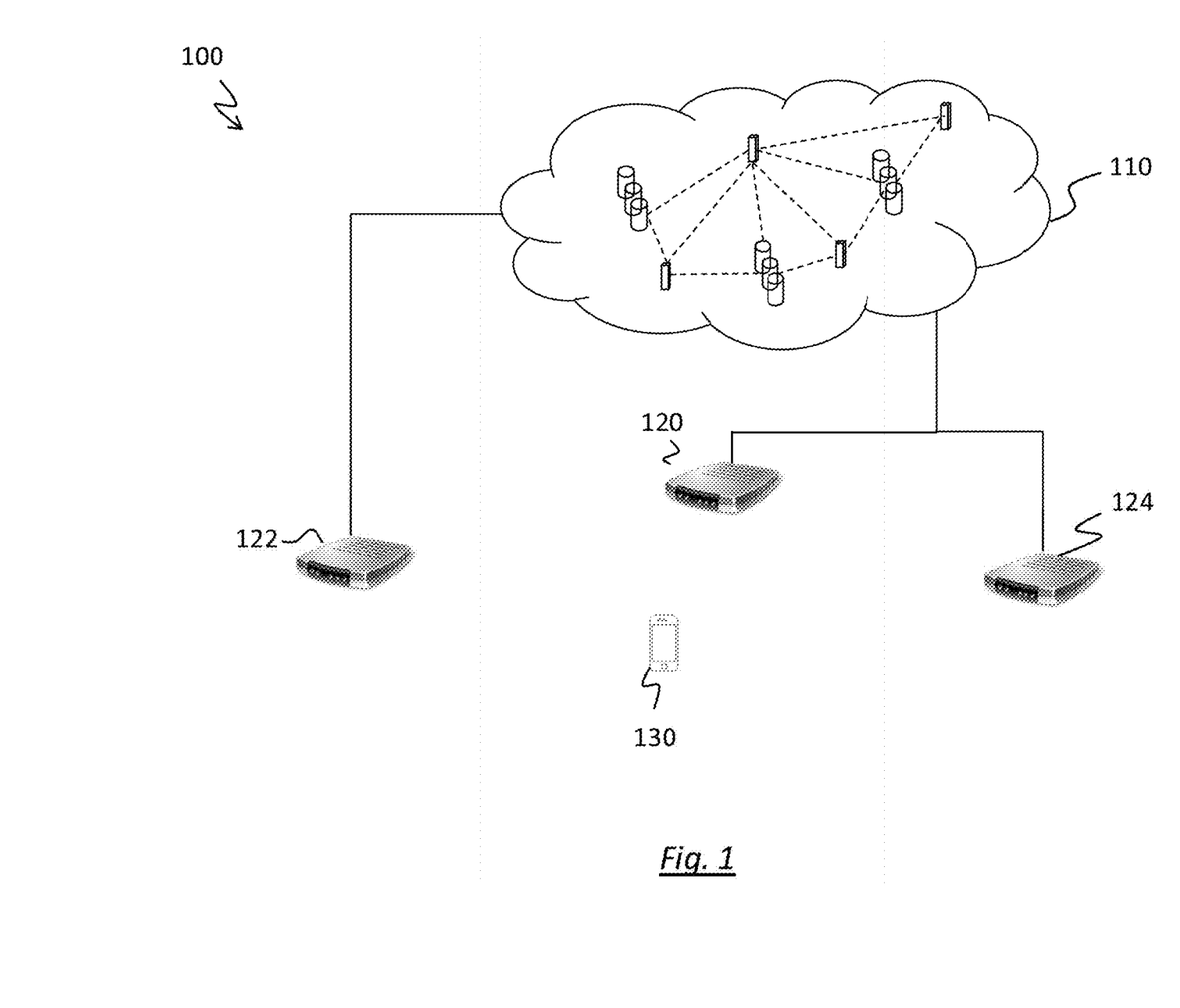
FIG. 1 is a schematic representation of an environment for implementing an embodiment of the disclosure.

FIG. 1 is a schematic representation of an environment for implementing an embodiment of the disclosure. Specifically, FIG. 1 shows Wi-Fi environment 100 having network 110 communicating with APs 120, 122 and 124. While FIG. 1 shows APs 120, 122 and 124 as part of network 110, the disclosed principles are not limited thereto and are equally applicable to environments where the AP is outside the network. APs 120, 122 and 124 may define one or more routers, base stations, modems, switches or any other device capable of forming a WLAN. STA 130 can be any mobile device capable of accessing a WLAN through Wi-Fi medium. Exemplary STAs include smartphones, laptops and tablets or any other wireless device. STA 130 can communicate with any of APs 120, 122 and 124. APs 120, 122 and 124 may compete with each other and with other devices for the medium. In the environment of FIG. 1, STA 130 can estimate its location as a function of AP location(s) with which it corresponds. For example, STA 130 may use one of ToF or FTM algorithms to determine its location relative to one or more of APs 120, 122 and 124.

Figure 2:
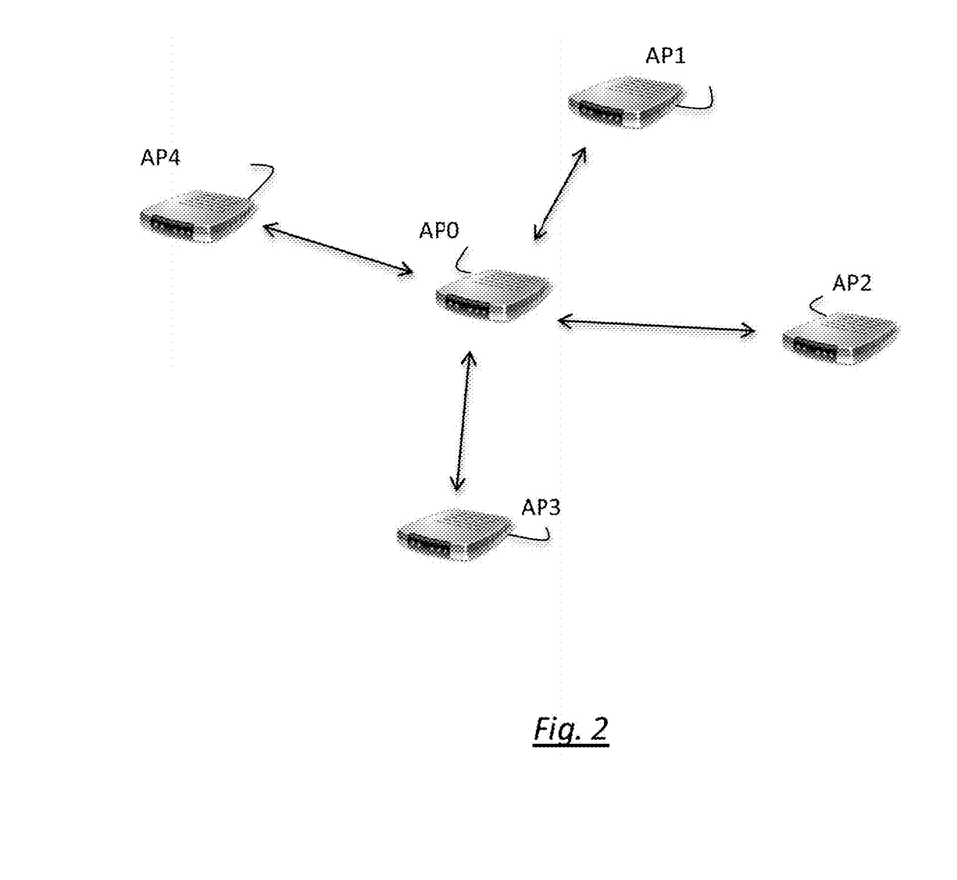
FIG. 2 schematically shows a zero-hop location discovery according to one embodiment of the disclosure.

FIG. 2 schematically shows a zero-hop location discovery according to one embodiment of the disclosure. In FIG. 1, AP0 denotes the root AP for the exemplary location determination protocol. In the embodiment of FIG. 1, AP0 does not know its own location. APs 1-4 are neighboring APs with known locations. The exemplary protocol may be triggered manually by AP0. The exemplary protocol may be part of a higher layer protocol or it may be periodically and automatically implemented. The location determination protocol may also be autonomously triggered or reiterated by the AP until a suitable location (or a location within an acceptable error range) is obtained. In one embodiment, the protocol may comprise the following phases: neighbor discovery, neighbor location query, range measurement, estimation/calculation and report.

At the neighbor discover phase, the root AP (e.g., AP0) can scan for one or more beacon signals to discover its neighboring APs. Other means for identifying the neighboring APs may be applied without departing from the disclosed principles. This phase of the protocol may be initiated and executed autonomously at the root AP.

Once the neighboring APs (i.e., AP1, AP2, AP3, AP4) are identified, the root AP can query all or a subset of its neighbors for their respective locations. The location may be one or more of an absolute location (e.g., pursuant to the World Geodetic System 1984 ("WGS84")), a local location (i.e., a location with respect to another coordinate) or both. The location may also include an estimated error information. Other location-related information, such as whether it is local or absolute coordinate information, may also be provided to the root AP. During this phase, each of the neighboring APs will respond to the root AP's location inquiry by transmitting signal containing appropriate location data. The neighboring APs may have own location data stored at a local memory circuitry. Alternatively, the neighboring APs may retrieve the location data from an external source, such as a cloud server. In one embodiment, the root AP may store location data received from each of the neighboring APs for future reference.

Subsequent to, or simultaneous with, the neighbor location discovery phase, the root AP may conduct a range measurement. The range measurement step may be optional and can be used for enhanced accuracy. Here, AP0 will conduct ToF and/or FTM procedures for each of the corresponding APs to determine, calculate or estimate the range between AP0 and each (or subset) of its neighbors. The range measurement will result in distance measurements from AP0 to each of the corresponding APs. The range measurement may optionally include a range error estimations. The range data can be associated with each corresponding AP along with the AP's reported location.

Having the reported AP locations as well as the measured range to each corresponding AP, the root AP can then determine its own location relative to its neighbors. The root AP may also determine its neighbor locations as a function of the locations from the query phase in addition to the new range information from the range measurement phase. The newly determined AP locations may be compared with the locations reported from each AP to identify any discrepancy.

In one embodiment, if no location information was obtained in the "query" phase, AP0 may select to arbitrarily assign a local coordinate grid with orientation and base its estimation on such a grid. The grid information may be included in the location reports.

Finally, AP0 may report a new estimated location for its neighbors or report its own location. The report can be made to a server or to the neighboring APs. The report may include a new estimated neighbor location and optionally an error estimation.

Figure 3:
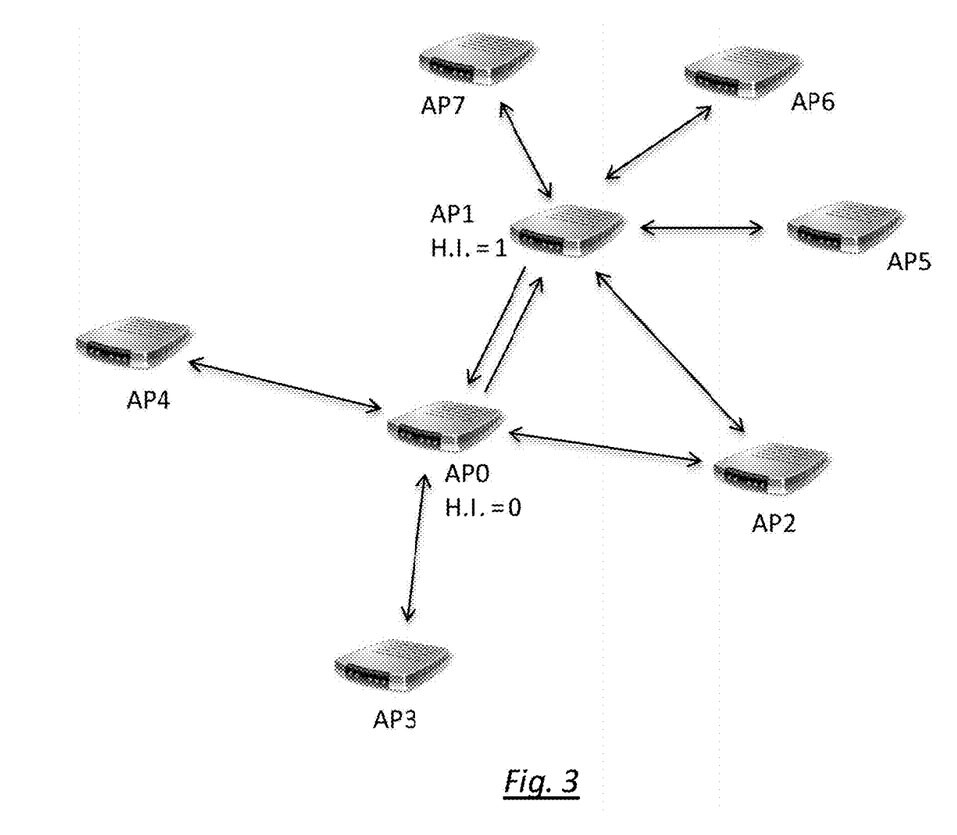
FIG. 3 schematically shows a single-hop location discovery according to another embodiment of the disclosure.

FIG. 3 schematically shows a single-hop location discovery according to one embodiment of the disclosure. Whereas in the embodiment of FIG. 2, the root AP had a zero-hop index, the embodiment of FIG. 3 shows a one-hop index. At FIG. 3, AP0 seeks to identify its location by scanning Wi-Fi signals and identifying AP1, AP2, AP3 and AP4. Because APO is querying directly available APs, the hop index (H.I.) for AP0 is set to zero. In response to the received query, each of AP2, AP3 and AP4 responds to AP0 with its known or estimated location. In the embodiment of FIG. 3, AP1 may not know its location and may respond accordingly. AP0 may then request AP1 to conduct its own location discovery algorithm and report back once its location has been estimated. Thus, AP1 becomes a secondary root AP.

To this end, AP1 scans for available Wi-Fi signals and identifies AP2, AP5, AP6 and AP7 as nearby APs. AP1, having a hop index of 1, queries each of the identified AP for their known or estimated location. AP1 may also conduct a range measurement to each of the identified AP2, AP5, AP6 and AP7. Based on the received location information and range measurements, AP1 can determine its own location. AP1 can then report its location to AP0 which, in turn, can determine its own location. As with FIG. 2, once each of AP0 and AP1 have determined their location, they can report to other APs or they can determine other AP locations. The embodiment of FIG. 3 can be readily applied to additional level by increasing the hop count.

Figure 4:
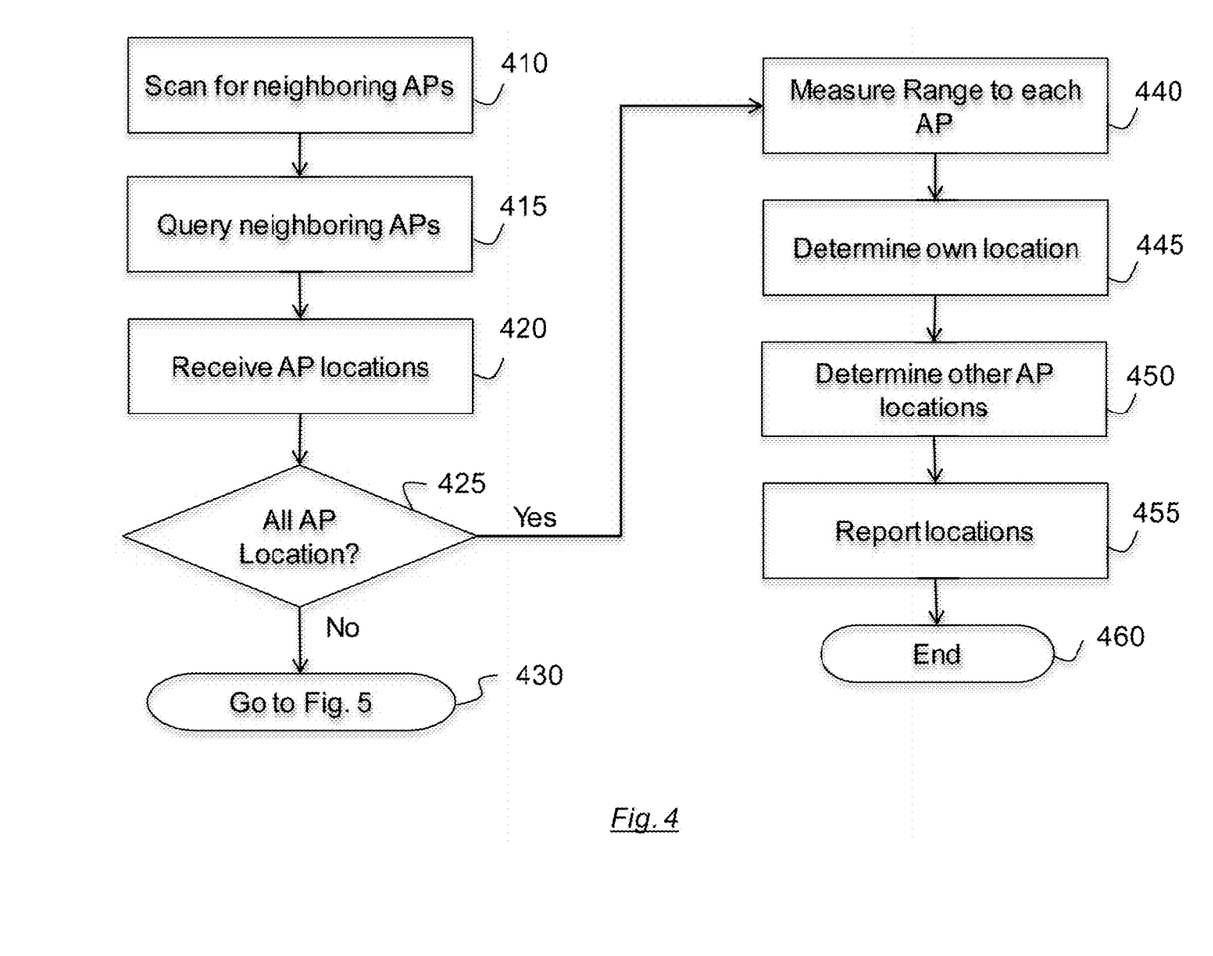
FIG. 4 is a flow diagram for implementing the embodiment of FIG. 2.

FIG. 4 is a flow diagram for implementing the embodiment of FIG. 2. The steps outlined in the exemplary flow diagram 4 may be implemented, entirely or partially, at the root AP or at an external device in communication with the root AP. In one embodiment, the root AP implements certain steps and reports the results to the external device. The external device uses the measurements to conduct the necessary calculation and determine the root AP's location.

The process of FIG. 4 starts at step 410 when a root AP seeks to determine its own location by scanning for neighboring APs. The root AP may scan the for beacon channels indicating available Wi-Fi channels. Once the neighboring APs are identified (step 415) the root AP queries the neighboring APs for their location. Responsive to the root APs inquiry, the neighboring APs respond at step 420 with their known or estimated locations. At step 425 an inquiry is made as to whether the root AP has received location information from all of the neighboring APs.

If all of the quarried APs have responded with location information, then the process continues at step 440. If one or more of neighboring APs have not reported their location information (i.e., an AP does not know its own location), then flow diagram of the FIG. 5 can be implemented. Under this circumstance, the root AP becomes the primary root AP and the subsequent APs can be secondary or tertiary APs.

At step 440, the root AP conducts a range measurement to each of the corresponding APs. This step can be optional to provided additional location estimation accuracy. Range measurement may be conducted using any of the known techniques, including ToF or FTM. Using the reported AP locations, and optionally, the range measurement corresponding to each AP the root AP can determine its own location at step 445. At optional step 450, the root AP may use data from its own location and range measurement to estimate the neighboring APs locations. This information can be used iteratively to fine-tune the root and the neighboring APs locations. At step 455, the root AP may report its location and optionally the location of its neighboring APs to an external device. The external device may be a cloud-based server. Step 455 is optional and may be ignored. The zero-hop index process of FIG. 4 ends at step 460.

Figure 5:
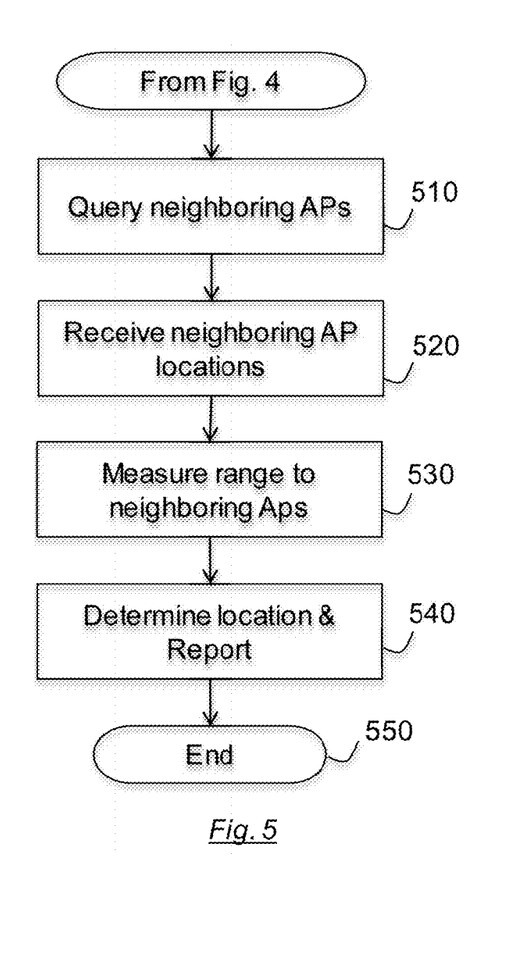
FIG. 5 is a flow diagram for implementing the embodiment of FIG. 3.

FIG. 5 is a continuation of the flow diagram of FIG. 4 and applies to instances where one or more of the neighboring AP (i.e., a secondary root AP) does not know its own location. The flow diagram of FIG. 5 may also be used for increased accuracy. For example, if the AP locations are not accurate enough, or the root AP may choose to implement the flow diagram of FIG. 5 to further implement (in terms of accuracy/changes-over-time from last update) additional measures.

As in the exemplary embodiment of FIG. 3, the secondary root AP may conduct self-discovery to determine its location. At step 510, the secondary root AP starts identifying its neighboring APs. Once the neighboring APs are identified, the secondary root AP can query each neighbor for its location. At step 520, the secondary root AP receives its neighbors locations and at step 530 an optional range measurement can be done to determine a distance to each of the neighboring APs. At step 540, the secondary root AP determines its own location as a function of the information obtained at steps 520 and 530. The secondary root AP may report its estimated location to the primary root AP (i.e., step 420, FIG. 4). The process ends at step 550.

With reference to the exemplary embodiment of FIG. 3, AP0 can set its hop index to 0. The hop index indicate the current depth level of the protocol. In one embodiment, the protocol initiator can choose the max depth level for the protocol (i.e., the max hop index). The initiator index is 0 for the protocol initiator. The direct neighbors will have be at hop 1. The neighbors of the direct neighbors will be at hop 2 and so on. APO may also set the number of max hops to the desired depth-levels of the protocol. The depth level determines how many additional neighbors may conduct location self-discovery. Each neighbor will then repeat the basic protocol with its corresponding neighbors, set its hop index to 1 and continue with the original max hops setting until max hops has reached. For hop index APs that are non-zero, an additional step can be added to report back—the next-hop AP (non-zero index AP) will report back to its former-hop (i.e., the AP that requested the protocol initiation) its newly calculated location (similar to the Basic Protocol-Step 2 answer). The former-hop AP can then choose to re-calculate its own location and neighbors, (i.e., repeating steps 4-5 of the basic protocol).

Figure 6:
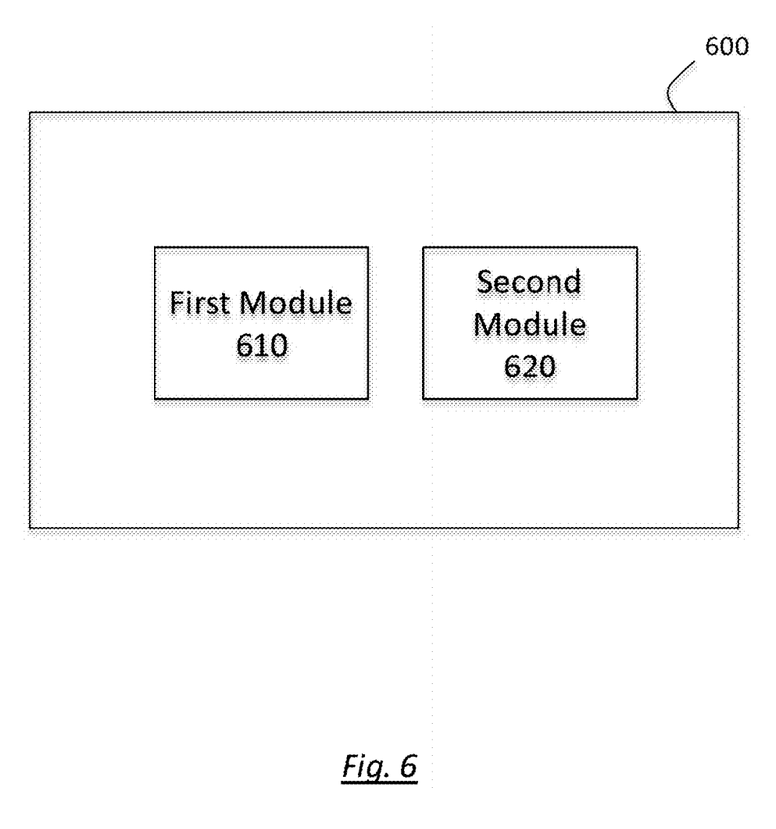
FIG. 6 schematically shows a device according to an embodiment of the disclosure.

In one embodiment of the disclosure, if hop max level or depth level permits, each of the neighbors will run the protocol separately (i.e., so AP1 will run it as a root with hop index 1 with its neighbors, AP2 will run it as a root with hop index, etc.). In one embodiment, the protocol can potentially be considered as spanning protocol and the spanning level determined by the max hop index FIG. 6 schematically shows a device according to another embodiment of the disclosure. Specifically, FIG. 6 shows device 600 which can be an integral part of a larger system or can be a stand-alone unit. For example, device 600 can define a system on chip configured to implement the disclosed methods. Device 600 may also be part of a larger system having multiple antennas, a radio and a memory system. Device 600 may be define a software or an App. In one embodiment, device 600 defines an APP location determination engine.

Device 600 includes first module 610 and second module 620. Modules 610 and 620 can be hardware, software or a combination of hardware and software (i.e., firmware). Further, each of modules 610 and 620 can define one or more independent processor circuits. In an exemplary embodiment, at least one of modules 610 or 620 includes a processor circuitry and a memory circuitry in communication with each other. In another embodiment, modules 610 and 620 define different parts of the same data processing circuit. In another exemplary embodiment, device 600 can be integrated with an AP.

In an exemplary embodiment, device 600 can be integrated with an AP seeking to identify its own location (i.e., root AP). Module 610 can be configured to identify one or more of a plurality of neighboring APs. The process of identifying neighboring APs may include scanning (or caused to be scanned) for available Wi-Fi signals and identifying APs associated with the signals. Module 610 may also request location information from each of the identified neighboring APs. Location information from the neighboring APs can be stored at a local or a remote memory circuit (not shown). Module 610 may also conduct (or cause to be conducted) a range measurement to determine the distance to each of the identified neighboring APs. Finally, first module 610 may correlate each of the neighboring AP's reported location with its corresponding measured range. The information can be tabulated and stored at a memory circuit (not shown). Second module 620, can receive the tabulated data directly from first module 610 or it may access the memory circuit to access the data. Second module 620 may then calculate its own location based on the available data. In one embodiment, the second module may also calculate estimated locations for one or more of the neighboring APs and report (or cause to be reported) the estimated locations to the remote APs.

In one embodiment, second module 620 may review location data received from the neighboring APs. If a neighboring AP (e.g., a secondary root AP) is unaware of its location, second module 620 may request the AP to conduct location self-discovery. The secondary root AP can then discover and obtain location information for its neighboring APs and report back to module 620. Second module 620 may use the information obtained from the secondary root AP to recalculate its position. Second module 620 may report location information to an external device or it may store the information for future use. The process may be repeated during regular intervals or it may be initiated by a triggering event.

Figure 7:
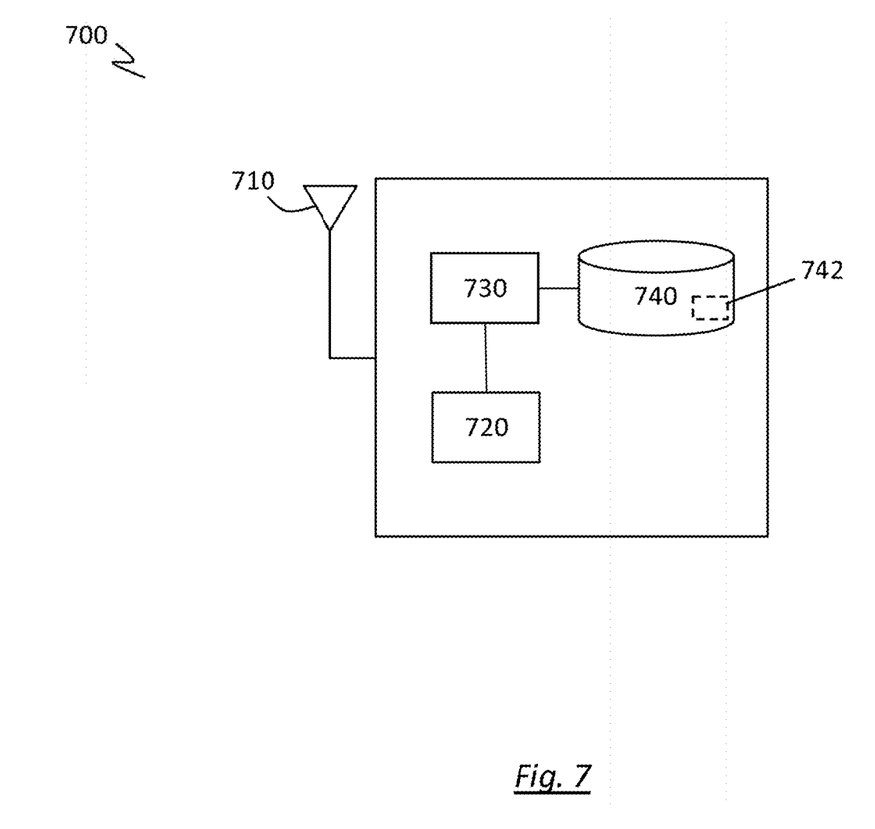
FIG. 7 schematically shows a system according to an embodiment of the disclosure.

FIG. 7 schematically shows a system according to an embodiment of the disclosure. For example, the steps of any of the above-disclosed flow diagrams may be implemented at the system of FIG. 7. System 700 of FIG. 7 may define a mobile device such as an AP, a router, smartphone, a tablet or any device capable of wireless communication. While system 700 is shown with antenna 710, the disclosure is not limited to having one antenna. Multiple antennas can be added to system 700 such that different signals for different protocols can be received at different antennas. The signal(s) received at antenna 710 are relayed to radio 720. Radio 720 may include transceiver components such as front-end receiver components or a receiver/transmitter. Although not shown, system 700 may be connected to a WLAN or the internet backbone.

Radio 720 may convert analog signals to a digital data stream and direct the data stream to processor 730. Processor 730 may include one or more modules as discussed in relation to FIG. 6. Processor 630 may also communicate with memory circuit 740. While shown as a separate circuitry in the exemplary system of FIG. 7, it should be noted that instructions 742 can be embedded on processor 730 as firmware to obviate the addition of memory circuit 740.

Memory circuit 740 may contain instructions 742 for processor 730 to implement one or more of the steps of the exemplary methods disclosed herein. Memory circuit 740 may define a non-transitory computer readable medium containing a set of instructions to processor 730 to perform a process comprising: (1) identify one or more of a plurality of neighboring APs, receiving from the one or more neighboring APs each of their respective locations, (2) measure a range from the primary AP to each of the one or more neighboring APs, and (3) determine the primary AP location as a function of the received location for each of the one or more neighboring APs and the measured range to each respective AP. Memory 742 may containing additional instructions, for example, to identify a primary or secondary root AP, set the hop index value, record range measurements and report the various location calculations.

The following examples pertain to further embodiments of the disclosure. Example 1 includes a method for autonomous Access Point (AP) location determination in a WLAN environment, comprising: identifying, at a primary AP, one or more of a plurality of neighboring APs; receiving from the one or more neighboring APs each of their respective locations; measuring a range from the primary AP to each of the one or more neighboring APs; and determining the primary AP location as a function of the received location for each of the one or more neighboring APs and the measured range to each respective AP.

Example 2 relates to the method of example 1, further comprising measuring the range to a neighboring AP using one of RSSI or FTM methods.

Example 3 relates to the method of example 1, further comprising receiving from the one or more neighboring APs one or more of an absolute location, an estimated location or a location error.

Example 4 relates to the method of example 1, further comprising estimating a location for at least one of the neighboring APs and reporting the estimated location back to the neighboring AP.

Example 5 relates to the method of example 1, further comprising selecting a secondary AP for determining its location relevant to the secondary AP's neighboring APs.

Example 6 relates to the method of example 5, further comprising: scanning, at the secondary AP, for one or more secondary neighboring APs; receiving from the one or more secondary neighboring APs each of their respective locations; measuring a range from the secondary AP to each of the one or more secondary neighboring APs; and determining the secondary AP location as a function of the received location for each of the one or more secondary neighboring APs and the measured range to each respective secondary neighboring AP.

Example 7 relates to the method of example 6, further comprising reporting the secondary AP location to the primary AP and determining a location for the primary AP.

Example 8 relates to an apparatus for autonomous location determination, the apparatus comprising: a first module configured to identify a plurality of neighboring APs in Wi-Fi communication with the apparatus and to receive a location signal from one or more of the plurality of the identified neighboring APs, the first module configured to measure a range to each of the one or more of the identified neighboring APs; a second module configured to determine a location as a function of the measured range and the received location signal from the one or more of the identified neighboring APs.

Example 9 relates to the apparatus of example 8, wherein the first module is further configured to measure the range to a neighboring AP based on the received signal strength using, Time-of-Flight or Fine-Time measurement techniques.

Example 10 relates to the apparatus of example 8, wherein the first module is further configured to receive from the one or more neighboring APs one or more of an absolute location, an estimated location or a location error.

Example 11 relates to the apparatus of example 8, wherein the second module is further configured to estimate a location for at least one of the neighboring APs and transmit the estimated location to the neighboring AP.

Example 12 relates to the apparatus of example 8, wherein one of the first or the second module is further configured to select a secondary AP for determining its location relevant to the secondary AP's neighboring APs.

Example 13 relates to the apparatus of example 8, wherein the secondary AP is further configured to receive from one or more secondary neighboring APs each of their respective locations, measure a range to each of the one or more secondary neighboring APs, and to determine the secondary AP location as a function of the received location and the measured range for each secondary neighboring AP.

Example 14 relates to a system for autonomous location determination, the system comprising: one or more antennas to transmit one or more signal; a radio to communicate with the one or more antennas; a processor to communication with the radio, the processor having a first module configured to identify a plurality of neighboring APs in Wi-Fi communication with the apparatus and to receive a location signal from one or more of the plurality of the identified neighboring APs; the processor having a second module configured to determine a location as a function of the received location signal from the one or more of the identified neighboring APs.

Example 15 relates to the system of example 14, wherein the first module is further configured to measure a range to each of the one or more of the identified neighboring APs.

Example 16 relates to the system of example 15, wherein the second module is further configured to determine a location as a function of the measured range and the received location signal from the one or more of the identified neighboring APs.

Example 17 relates to the system of example 14, wherein the first module is further configured to receive from the one or more neighboring APs one or more of an absolute location, an estimated location or a location error.

Example 18 relates to the system of example 14, wherein the second module is further configured to estimate a location for at least one of the neighboring APs and to transmit the estimated location to the neighboring AP.

Example 19 relates to the system of example 15, wherein one of the first or the second module is further configured to select a secondary AP for determining its location relevant to the secondary AP's neighboring APs.

Example 20 relates to a computer-readable storage device containing a set of instructions to cause a computer to perform a process comprising identify one or more of a plurality of neighboring APs, receiving from the one or more neighboring APs each of their respective locations, measure a range from the primary AP to each of the one or more neighboring APs, and determine the primary AP location as a function of the received location for each of the one or more neighboring APs and the measured range to each respective AP.

Example 21 relates to the computer-readable storage device of example 20, wherein the instructions further comprise instructions to cause the computer to measure the range to a neighboring AP using one of RSSI or FTM methods.

Example 22 relates to the computer-readable storage device of example 20, wherein the instructions further comprise instructions to cause the computer to receive from the one or more neighboring APs one or more of an absolute location, an estimated location or a location error.

Example 23 relates to the computer-readable storage device of example 20, wherein the instructions further comprise instructions to cause the computer to estimate a location for at least one of the neighboring APs and reporting the estimated location back to the neighboring AP.

Example 24 relates to the computer-readable storage device of example 20, wherein the instructions further comprise instructions to cause the computer to select a secondary AP for determining its location relevant to the secondary AP's neighboring APs.

While the principles of the disclosure have been illustrated in relation to the exemplary embodiments shown herein, the principles of the disclosure are not limited thereto and include any modification, variation or permutation thereof.

What is claimed is:

1. A method for autonomous Access Point (AP) location determination in a WLAN environment, comprising:
    identifying, at a primary AP, one or more of a plurality of neighboring APs;
    sending a query from the primary AP to querying the one or more neighboring APs for each of their respective locations;
    receiving from the one or more neighboring APs each of their respective locations;
    measuring a range from the primary AP to each of the one or more neighboring APs;
    receiving from the one or more neighboring APs one or more of an absolute location, an estimated location and a location error; and
    determining the primary AP location as a function of the received location for each of the one or more neighboring APs and the measured range to each respective AP; and
    estimating a location for each of the one or more neighboring APs based on the determined primary AP location and the measured range to each respective AP from the primary AR
    wherein the primary AP further estimates a range to at least one of the plurality of neighboring APs a Fine-Time-Measurement (FTM); and
    wherein a first of the plurality of neighboring APs determines its location as a function its proximity to a group of immediately neighboring APs.

2. The method of claim 1, further comprising estimating a location for at least one of the neighboring APs and reporting the estimated location back to the neighboring AP.

3. The method of claim 1, further comprising selecting a secondary AP for determining its location relevant to the secondary AP's neighboring APs.

4. The method of claim 3, further comprising:
    scanning, at the secondary AP, for one or more secondary neighboring APs;
    receiving from the one or more secondary neighboring APs each of their respective locations;
    measuring a range from the secondary AP to each of the one or more secondary neighboring APs; and
    determining the secondary AP location as a function of the received location for each of the one or more secondary neighboring APs and the measured range to each respective secondary neighboring AP.

5. The method of claim 4, further comprising reporting the secondary AP location to the primary AP and determining a location for the primary AP.

6. An apparatus for autonomous location determination, the apparatus comprising:
    a first module configured to identify a plurality of neighboring APs in Wi-Fi communication with the apparatus, the first module further configured to query the one or more neighboring APs for each of their respective locations and receive a location signal from one or more of the plurality of the identified neighboring APs, the first module configured to measure a range to each of the one or more of the identified neighboring APs using Fine-Time-Measurement (FTM);
    a second module configured to determine a location as a function of the measured range and the received location signal from the one or more of the identified neighboring APs, the second module further configured to estimate a location for each of the one or more of the identified neighboring APs based on the measured range to each respective AP;
    wherein the first module is further configured to receive from the plurality of neighboring APs one or more of an absolute location, an estimated location and a location error; and wherein a first of the plurality of neighboring APs determines its location as a function its proximity to a group of immediately neighboring APs.

7. The apparatus of claim 6, wherein the first module is further configured to measure the range to a neighboring AP based on the received signal strength using, Time-of-Flight or Fine-Time measurement techniques.

8. The apparatus of claim 6, wherein the first module is further configured to receive from the one or more neighboring APs one or more of an absolute location, an estimated location and a location error.

9. The apparatus of claim 6, wherein the second module is further configured to estimate a location for at least one of the neighboring APs and transmit the estimated location to the neighboring AP.

10. The apparatus of claim 6, wherein one of the first or the second module is further configured to select a secondary AP for determining its location relevant to the secondary AP's neighboring APs.

11. The apparatus of claim 6, wherein the secondary AP is further configured to receive from one or more secondary neighboring APs each of their respective locations, measure a range to each of the one or more secondary neighboring APs, and to determine the secondary AP location as a function of the received location and the measured range for each secondary neighboring AP.

12. A system for autonomous location determination, the system comprising:
one or more antennas to transmit one or more signal;
a radio to communicate with the one or more antennas;
a processor to communication with the radio, the processor having a first module configured to identify a plurality of neighboring APs in Wi-Fi communication with the apparatus, query the one or more neighboring APs for each of their respective locations and receive a location signal from one or more of the plurality of the identified neighboring APs, the first module further configured to estimate a range to at least one of the plurality of neighboring APs through Fine-Time-Measurement (FTM);
the processor having a second module configured to determine a location as a function of the received location signal from the one or more of the identified neighboring APs and as a function of the estimated range, the second module further configured to estimate a location for each of the one or more neighboring APs based on the estimated range to each respective AP, wherein the location signal further comprises an absolute location, an estimated location and a location error; and wherein a first of the plurality of neighboring APs determines its location as a function its proximity to a group of immediately neighboring APs.

13. The system of claim 12, wherein the first module is further configured to measure a range to each of the one or more of the identified neighboring APs.

14. The system of claim 13, wherein the second module is further configured to determine a location as a function of the measured range and the received location signal from the one or more of the identified neighboring APs.

15. The system of claim 12, wherein the second module is further configured to estimate a location for at least one of the neighboring APs and to transmit the estimated location to the neighboring AP.

16. The system of claim 14, wherein one of the first or the second module is further configured to select a secondary AP for determining its location relevant to the secondary AP's neighboring APs.

17. A computer-readable, non-transitory, storage device containing a set of instructions to cause a computer to perform a process comprising:
identify one or more of a plurality of neighboring APs;
query the one or more neighboring APs for each of their respective locations; and
receive from the one or more neighboring APs each of their respective locations comprising an absolute location, an estimated location and location error;
measure a range from the primary AP to each of the one or more neighboring APs through Fine-Time-Measurement (FTM) between the primary AP and each of the one or more neighboring APs; and
determine the primary AP location as a function of the received location for each of the one or more neighboring APs and the measured range to each respective AP; and
estimate a location for each of the one or more neighboring APs based on the determined primary AP location and the measured range to each respective AP from the primary AP; and
wherein a first of the plurality of neighboring APs determines its location as a function its proximity to a group of immediately neighboring APs.

18. The computer-readable, non-transitory, storage device of claim 17, wherein the instructions further comprise instructions to cause the computer to estimate a location for at least one of the neighboring APs and reporting the estimated location back to the neighboring AP.

19. The computer-readable, non-transitory, storage device of claim 17, wherein the instructions further comprise instructions to cause the computer to select a secondary AP for determining its location relevant to the secondary AP's neighboring APs.

* * * * *

UNITED STATES PATENT AND TRADEMARK OFFICE
CERTIFICATE OF CORRECTION

PATENT NO. : 10,939,407 B2
APPLICATION NO. : 15/123797
DATED : March 2, 2021
INVENTOR(S) : Steiner It is certified that error appears in the above-identified patent and that said Letters Patent is hereby corrected as shown below:

In the Claims

Claim 1, Column 10, Lines 15:
"the primary AR." should read "the primary AP."

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*